United States Patent
Akutsu et al.

(10) Patent No.: US 9,632,277 B2
(45) Date of Patent: Apr. 25, 2017

(54) IMAGE PICKUP LENS UNIT AND MANUFACTURING METHOD THEREOF

(75) Inventors: Dai Akutsu, Nerima-ku (JP); Hajime Mori, Fuchu (JP); Takemi Miyazaki, Hamura (JP)

(73) Assignee: Konica Minolta, Inc., Tokyo (JP)

( * ) Notice: Subject to any disclaimer, the term of this patent is extended or adjusted under 35 U.S.C. 154(b) by 497 days.

(21) Appl. No.: 14/007,184

(22) PCT Filed: Mar. 27, 2012

(86) PCT No.: PCT/JP2012/058020
§ 371 (c)(1),
(2), (4) Date: Sep. 24, 2013

(87) PCT Pub. No.: WO2012/133464
PCT Pub. Date: Oct. 4, 2012

(65) Prior Publication Data
US 2014/0016215 A1 Jan. 16, 2014

(30) Foreign Application Priority Data
Mar. 28, 2011 (JP) .................................. 2011-070984

(51) Int. Cl.
*G02B 7/02* (2006.01)
*G02B 15/14* (2006.01)
(Continued)

(52) U.S. Cl.
CPC ............ *G02B 7/02* (2013.01); *B29D 11/0074* (2013.01); *G02B 7/006* (2013.01); *G02B 7/021* (2013.01); *G02B 7/022* (2013.01)

(58) Field of Classification Search
CPC . G02B 3/00; G02B 21/14; G02B 7/10; G02B 25/002; G02B 7/02; G02B 7/04;
(Continued)

(56) References Cited

U.S. PATENT DOCUMENTS

| 7,397,023 B2 * | 7/2008 | Tsukamoto | ....... H01L 27/14618 250/208.1 |
| 2005/0157608 A1 * | 7/2005 | Nagatsuka | ......... G11B 7/13925 369/44.14 |

(Continued)

FOREIGN PATENT DOCUMENTS

| CN | 1808201 | 7/2006 |
| CN | 101329438 | 2/2008 |

(Continued)

OTHER PUBLICATIONS

Office Action dated Aug. 4, 2015 which issued in the corresponding Taiwanese Patent Application No. 101110581.

(Continued)

*Primary Examiner* — Dawayne A Pinkney
(74) *Attorney, Agent, or Firm* — Cozen O'Connor

(57) ABSTRACT

A small, high-performance image pickup lens unit having an IR cut filter that can be incorporated reliably therein while avoiding an increase in processing complexity. A sealing portion 14 is disposed between a lens 11 and an IR cut filter 12 in order to seal an internal space IS sandwiched between the lens 11 and the IR cut filter 12, and therefore a holder 40 can be molded integrally with the lens 11 and the IR cut filter 12 incorporated therein while preventing liquid resin MP from flowing in between the lens 11 and the IR cut filter 12. By molding the holder 40 integrally with the lens 11 and the IR cut filter 12 incorporated therein in this manner, an image pickup lens unit 100 can be reduced in size, and reductions in the number of components and the number of assembly man-hours can be achieved.

8 Claims, 11 Drawing Sheets

(51) Int. Cl.
*F21V 17/00* (2006.01)
*G03B 21/14* (2006.01)
*G03B 17/00* (2006.01)
*G02B 7/00* (2006.01)
*B29D 11/00* (2006.01)

(58) Field of Classification Search
CPC .. G02B 7/08; G02B 7/102; F21V 9/08; G03B 17/14; H04N 5/2254; H04N 5/2251; H04N 5/2253
USPC ............ 359/811–830, 642, 703, 704, 694; 362/455; 353/100; 396/529–530; 348/335, 340, 373–374
See application file for complete search history.

(56) References Cited

U.S. PATENT DOCUMENTS

2007/0091198 A1* 4/2007 Watanabe ............ H04N 5/2254 348/340
2009/0059398 A1* 3/2009 Tsai .................... G02B 13/0025 359/819
2010/0182483 A1* 7/2010 Majima ................ G02B 3/0056 348/340

FOREIGN PATENT DOCUMENTS

| | | |
|---|---|---|
| JP | 2004-266844 | 9/2004 |
| JP | 2006-284991 | 10/2006 |
| JP | 2008-233512 | 10/2008 |
| JP | 2009-071631 | 4/2009 |
| JP | 2009-75270 | 4/2009 |
| JP | 2010-213060 | 9/2010 |

OTHER PUBLICATIONS

Office Action dated Mar. 31, 2015 which issued in the corresponding Japanese Patent Application No. 2013-507642.

* cited by examiner

IMAGE PICKUP LENS UNIT AND MANUFACTURING METHOD THEREOF

RELATED APPLICATIONS

This is a U.S. national stage of International application No. PCT/JP2012/058020 filed on Mar. 27, 2012.

This application claims the priority of Japanese application no. 2011-070984 filed Mar. 28, 2011, the entire content of which is hereby incorporated by reference.

TECHNICAL FIELD

The present invention relates to an image pickup lens unit in which a lens and so on are incorporated into a holder, and to a manufacturing method thereof.

BACKGROUND ART

With recent reductions in the size and thickness of portable telephones and the like, similar reductions in the size and thickness of an image pickup lens unit incorporated into the portable telephone or the like have become necessary. At the same time, however, demand for increased precision therein has increased. As a result, a contradictory problem has arisen in that the lens unit must be reduced in size while making an optical lens as large as possible in order to increase the precision of an optical performance. To solve this problem, it has become important to reduce the size of a holder.

A conventional image pickup lens unit is embedded in the holder so that the optical lens is held peripherally, and in a camera module including this lens unit, an IR cut filter is disposed between the lens and an imaging device. The IR cut filter is typically assembled by a method of fixing the IR cut filter to the holder of the lens unit using an adhesive after the lens unit has been molded. With this method, however, a surface area to which the adhesive is applied decreases as the size of the camera module is reduced, making it difficult to fix the IR cut filter reliably.

To solve the problem of defective adhesion caused by a reduction in the adhesion surface area, a method of forming the IR cut filter by insert-molding so that the IR cut filter can be fixed reliably without using an adhesive has been proposed (see Patent Document 1). In this method, the IR cut filter is set in a housing mold, whereupon resin is introduced such that the IR cut filter is molded integrally with the housing, and simultaneously a peripheral edge portion of the IR cut filter is embedded in the housing. As a result, a fixing surface area of the IR cut filter is secured while achieving a reduction in the size of the holder in comparison with the method of fixing the IR cut filter using an adhesive. However, when the holder portion of the lens unit and the housing of the IR cut filter are molded separately, the number of processes increases, leading to new problems of an increase in cost and a reduction in yield.

CITATION LIST

Patent Literature

Patent Document 1: Japanese Patent Application Publication No. 2009-761631

SUMMARY OF INVENTION

The present invention has been designed in consideration of these problems in the background art, and an object thereof is to provide a small, high-performance image pickup lens unit having an IR cut filter that can be incorporated reliably therein while avoiding an increase in processing complexity.

Another object of the present invention is to provide a method of manufacturing a small, high-performance image pickup lens unit having the IR cut filter described above.

An image pickup lens unit according to the present invention includes (a) a lens, (b) a filter, (c) a holder that holds the lens and the filter in an interior thereof, and (d) a sealing portion disposed between the lens and the filter in order to seal an internal space sandwiched between the lens and the filter.

In the image pickup lens unit described above, the sealing portion is disposed between the lens and the filter in order to seal the internal space sandwiched between the lens and the filter, and therefore the holder can be molded integrally with the lens and the filter incorporated therein while preventing resin from flowing in between the lens and the filter. By molding the holder integrally with the lens and the filter incorporated therein in this manner, the image pickup lens unit can be reduced in size, and reductions in the number of components and the number of assemblyman-hours can be achieved.

According to a specific aspect of the present invention, in the image pickup lens unit described above, the sealing portion includes a contact surface that makes close contact with a filter frame surface of the filter, which opposes the lens. In this case, the internal space is sealed using the filter frame surface.

According to another aspect of the present invention, the sealing portion is formed integrally with the lens. In this case, the sealing portion can be formed so as to be annexed to the lens, thereby further facilitating manufacture and assembly processes.

According to a further aspect of the present invention, the sealing portion is formed separately from the lens and is formed from a different material from the lens. In this case, the sealing portion can easily be provided with a shape and functions that are suited to purpose.

According to a further aspect of the present invention, the sealing portion includes a contact surface that makes close contact with a lens frame surface of the lens, which opposes the filter. In this case, the internal space is sealed using the lens frame surface.

According to a further aspect of the present invention, the sealing portion includes a positioning portion that aligns the lens with the filter. In this case, the filter can be positioned accurately relative to the lens by the sealing portion, and therefore an optical performance of the image pickup lens unit can be improved.

According to a further aspect of the present invention, the positioning portion is a fitting portion including a step. In this case, the filter and the lens can be positioned accurately within a limited space.

According to a further aspect of the present invention, a plurality of lenses are held in the interior of the holder. In this case, the optical performance of the image pickup lens unit can be improved by the plurality of lenses.

According to a further aspect of the present invention, the plurality of lenses include a positioning portion for aligning the plurality of lenses with each other. In this case, the plurality of lenses can be aligned within the holder reliably.

According to a further aspect of the present invention, the holder is formed from at least one of LCP (Liquid Crystal Polymer) resin and PPA (Polyphthalamide) resin. In this case, LCP and PPA exhibit superior heat resistance and chemical resistance. In the image pickup lens unit according to the present invention, fixing using an adhesive is not required, and therefore LCP and PPA, which are normally difficult to fix using an adhesive, are preferably employed.

According to a further aspect of the present invention, the filter is constructed by forming a filter membrane that blocks infrared rays, on a substrate formed from a glass material. In other words, the filter is an IR cut filter.

A manufacturing method for the image pickup lens unit according to the present invention, which includes a lens, a filter, and a holder that holds the lens and the filter in an interior thereof, includes the steps of: holding the lens and the filter using a first mold and a second mold, and forming a molding space on a periphery of the lens and the filter; and molding a holder member that holds the lens and the filter in an interior thereof by charging a resin into the molding space and hardening the resin.

In the manufacturing method described above, the holder member that holds the lens and the filter in the interior thereof is molded by charging the resin into the molding space and hardening the resin, and therefore the holder can be molded integrally with the lens and the filter incorporated therein. By molding the holder integrally with the lens and the filter incorporated therein in this manner, the image pickup lens unit can be further reduced in size, and reductions in the number of components and the number of assembly man-hours can be achieved.

According to a specific aspect of the present invention, in the manufacturing method described above, when the molding space is formed on the periphery of the lens and the filter, a sealing portion for sealing an internal space sandwiched between the lens and the filter is disposed between the lens and the filter. In this case, when the holder is molded integrally with the lens and the filter incorporated therein, resin can be prevented from flowing in between the lens and the filter.

According to a specific aspect of the present invention, in the manufacturing method described above, before the molding space is formed by closing the first mold and the second mold, the lens is held by the first mold and the filter is held by the second mold. In this case, the lens and the filter can be combined appropriately by closing and clamping the first and second molds.

According to another aspect of the present invention, at least one of the first mold and the second mold includes a displacement mechanism for adjusting a position of at least one of the lens and the filter in a mold opening/closing direction. In this case, when the holder is molded integrally with the lens and the filter incorporated therein, it is possible to prevent excessive force from being applied between the lens and the filter, and therefore possible to prevent an unintended gap from forming between the lens and the filter.

According to a further aspect of the present invention, at least one of the first mold and the second mold includes a fixing mechanism that suctions at least one of the lens and the filter using negative pressure in order to hold the lens or the filter. In this case, the lens and the filter are supported on the first mold and the second mold by an appropriate force both before and while the first and second molds are closed.

According to a further aspect of the present invention, at least one of the first mold and the second mold includes a positioning holding portion for positioning at least one of the lens and the filter relative to the mold while holding the lens or the filter. In this case, the lens and the filter can be aligned precisely via the first and second molds.

According to a further aspect of the present invention, the lens and the filter are positioned and attached to at least one of the first mold and the second mold in an open condition using an attachment jig. In this case, an improvement in workability can be achieved when attaching the lens and the filter to the first mold and the second mold, and as a result, the lens and the filter can be combined appropriately, precisely, and easily.

According to a further aspect of the present invention, the lens and the filter are attached to at least one of the first mold and the second mold while being temporarily assembled. In this case, the lens and the filter can be combined precisely in advance.

According to a further aspect of the present invention, in order to hold a first lens and a second lens in the interior of the holder, the first lens is held by the first mold and a temporary assembly of the second lens and the filter is held by the second mold, whereupon the first mold and the second mold are clamped such that the first lens contacts the second lens. In this case, the first lens, the second lens, and the filter can be aligned and fixed precisely in the holder.

According to a further aspect of the present invention, the holder is formed from at least one of LCP resin and PPA resin.

DESCRIPTION OF EMBODIMENTS

[First Embodiment]

A structure of an image pickup lens unit according to a first embodiment of the present invention and a method of manufacturing the image pickup lens unit will be described below with reference to the drawings.

Figure 1A:
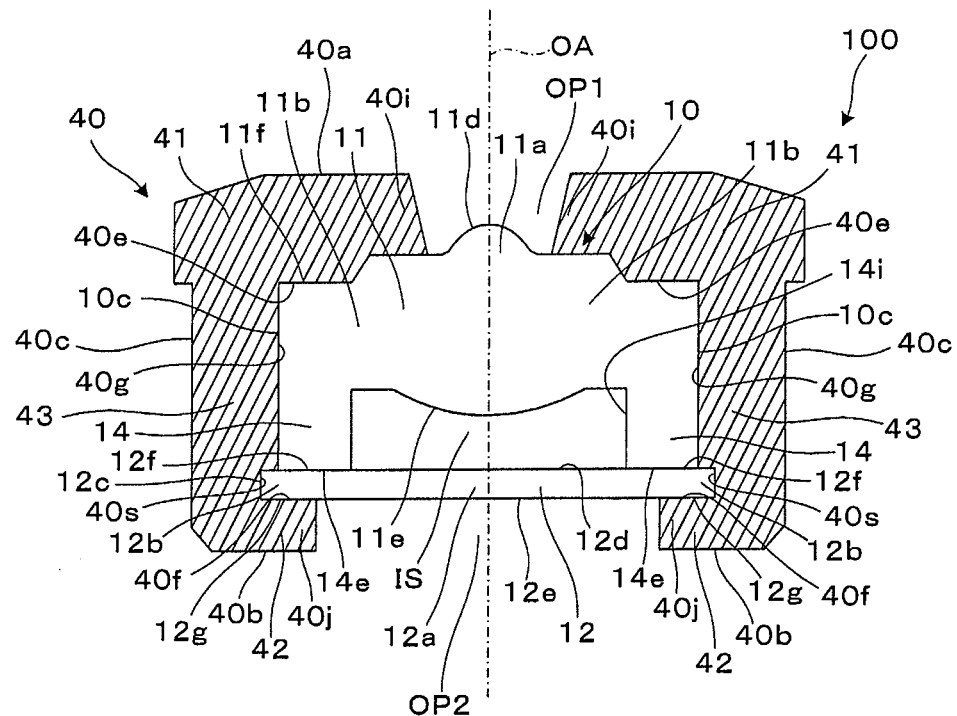
FIG. 1A is a side sectional view showing a structure of an image pickup lens unit according to a first embodiment.
Figure 1B:
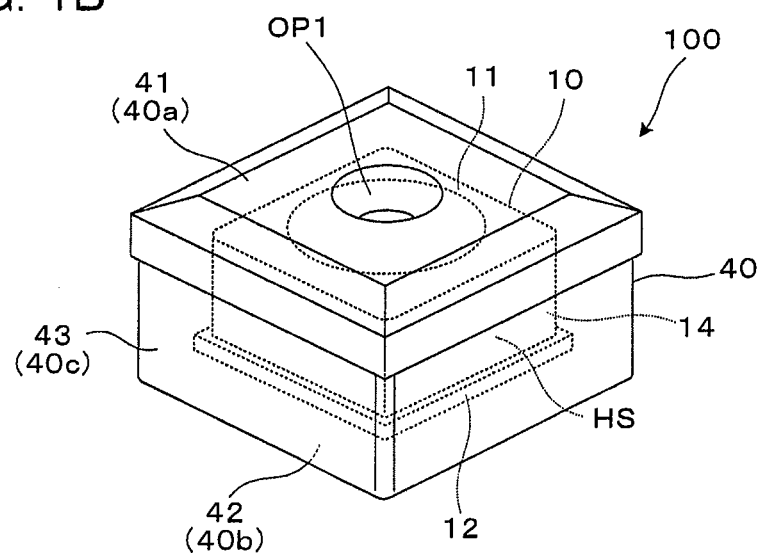
FIG. 1B is a perspective view of the image pickup lens unit.

As shown in FIGS. 1A and 1B, an image pickup lens unit 100 includes a block-shaped optical member 10, a plate-shaped IR cut filter 12, and a case-shaped holder 40 that houses the optical member 10 and the IR cut filter 12 integrally.

Here, the optical member 10 is cut out from a lens wafer (a wafer-shaped base material) on which a large number of lenses are arranged by dicing, for example, and when seen from above, has a rectangular outline with a quadratic prism-like side faces. The optical member 10 includes a lens 11 serving as a main body having an optical function, and a sealing portion 14 interposed between the lens 11 and the IR cut filter 12, wherein the lens 11 and the sealing portion 14 are integrated to form a single member.

The lens 11 of the optical member 10 includes a lens main body 11a that has a circular outline and is provided in a central portion around an optical axis OA, and a frame portion 11b that has a rectangular outline and extends from a periphery of the lens main body 11a. The lens main body 11a is an aspheric lens having first and second optical surfaces 11d and 11e, for example.

The sealing portion 14 is a square tube-shaped member having the optical axis OA as an axial direction. The sealing portion 14 is connected to the frame portion 11b of the optical member 10 on an upper end side thereof, and thereby integrated with the optical member 10 as described above. Further, an annular contact surface 14e that closely or tightly contacts an outer periphery of the IR cut filter 12 so as to support the IR cut filter 12 is provided on a lower end side of the sealing portion 14. Furthermore, an inner surface 14i of the sealing portion 14 is covered by a light blocking coating. The sealing portion 14 serves as a positioning portion that prevents the IR cut filter 12 from tilting and regulates an interval between the lens 11 and the IR cut filter 12. The sealing portion 14 also serves to seal an inner space IS sandwiched between the lens 11 and the IR cut filter 12. In other words, during molding of the holder 40, to be described below, the sealing portion 14 prevents resin from flowing between the lens 11 and the IR cut filter 12 inserted into the holder 40. As a result, insert-molding can be performed with the lens 11 and the IR cut filter 12 disposed opposite each other.

The optical member 10 described above is formed from a hardening resin possessing reflow heat resistance, for example. Thermosetting resin, photosetting resin, radiation curable resin, and so on may be cited as examples of this type of hardening resin. Note that the optical member 10 does not have to be formed entirely from resin, and may be constructed by sandwiching a glass plate between resin molded bodies or resin layers, for example. In this case, either an entire main surface of the glass plate is covered by the resin molded bodies or a center of the main surface of the glass plate is covered by the resin molded bodies.

The IR cut filter 12 is cut out from a sheet-form filter plate by dicing, for example, and has a rectangular outline when seen from above. The IR cut filter 12 is constructed by forming a filter membrane that blocks infrared rays, on a light transmitting substrate formed from a glass material, for example, and possesses reflow heat resistance. The IR cut filter 12 includes a filter main body 12a that has a circular outline and is provided in a central portion around the optical axis OA, and a frame portion 12b that has a rectangular outline and extends from a periphery of the filter main body 12a. The filter main body 12a includes first and second flat surfaces 12d, 12e forming a substantially parallel pair through which light from the lens 11 passes. A contact surface (a filter frame surface) 12f that is supported by the sealing portion 14 so as to contact the contact surface 14e of the sealing portion 14 is provided on the frame portion 12b of the IR cut filter 12. Note that the substrate of the IR cut filter 12 is not limited to glass, and may be formed from a hardening resin possessing reflow heat resistance or the like.

Further, the IR cut filter 12 is not limited to a structure in which a filter membrane is formed on a substrate, and may be constituted by a structure on which an antireflection film is formed or a structure in which infrared rays are blocked by the entire substrate.

The holder 40 housing the optical member 10 and the IR cut filter 12 integrally is formed from a thermoplastic resin (LCP, PPA, or the like, for example) possessing reflow heat resistance, and includes an upper portion 41 having a rectangular plate-shaped outline, a bottom portion 42 having a rectangular frame-shaped outline, and a side wall portion 43 having a rectangular tube-shaped outline. A rectangular prism-shaped housing space HS in which the optical member 10 and the IR cut filter 12 are fitted and held is formed in an interior of the holder 40. As will be described in detail below, the holder 40 is molded integrally by resin injection molding so as to be formed as a single integral member.

As noted above, the optical member 10, the IR cut filter 12, and the holder 40 are formed from materials possessing reflow heat resistance, and therefore the heat resistant image pickup lens unit 100 can be processed in a reflow process.

The upper portion 41 of the holder 40 opposes a frame surface 11f on an upper side of the optical member 10 held in the housing space HS so as to limit upward movement of the optical member 10 along the optical axis OA. The bottom portion 42 opposes a second frame surface 12g on a lower side of the IR cut filter 12 so as to limit downward movement of the IR cut filter 12 along the optical axis OA. The side wall portion 43 opposes four side faces 10c of the optical member 10, side faces 12c of the IR cut filter 12, and so on so as to limit movement of the optical member 10 and the IR cut filter 12 in a lateral direction perpendicular to the optical axis OA. Hence, the upper portion 41 and the side wall portion 43 of the single holder 40 are in close or tight contact with the optical member 10 and so on, while the bottom portion 42 is in close or tight contact with the IR cut filter 12. The single holder 40 is therefore capable of holding the optical member 10 and the IR cut filter 12 with stability from the periphery thereof while preventing mutual positional deviation between the optical member 10 and the IR cut filter 12.

A circular opening OP1 is formed in a center of the upper portion 41, and an annular edge portion 40i surrounding the opening OP1 is disposed opposite in an outside vicinity or a periphery of the optical surface 11d of the optical member 10 so as to support the optical surface 11d and shield the periphery of the optical surface 11d. The edge portion 40i therefore functions as a type of stop or diaphragm. A rectangular opening OP2 is formed in the bottom portion 42, and an annular edge portion 40j surrounding the opening OP2 opposes a periphery of a second frame surface 12e of the IR cut filter 12 so as to support a periphery of the frame portion 12b.

An outside surface of the optical member 10, excluding the optical surface 11d that is ultimately exposed and a region in the vicinity of the optical surface 11d that is contacted by a mold during molding of the holder 40, comes into contact with unhardened liquid or fluid resin during injection molding of the holder 40, and therefore, when the resin hardens, an inner surface 40e of the upper portion 41 of the holder 40 and an inner surface 40g of the side wall portion 43 of the holder 40 are welded to the frame surface 11f and the side faces 10c of the optical member 10 without gaps. Further, an outside surface of the IR cut filter 12, excluding the second flat surface 12e that is ultimately exposed and a region in the vicinity of the second flat surface 12e that is contacted by a mold during molding of the holder 40, comes into contact with the unhardened liquid resin during injection molding of the holder 40, and therefore, when the resin hardens, an inner surface 40f of the bottom portion 42 of the holder 40 and so on are welded to the second frame surface 12g and the side faces 12c of the IR cut filter 12 without gaps. Here, the optical member 10 is made of resin, and therefore a front surface of the frame surface 11f of the optical member 10 is softened by heat generated during injection molding of the holder 40 such that the frame surface 11f is welded to the inner surface 40e of the upper portion 41 of the holder 40, for example. As a result, the frame surface 11f of the optical member 10 and the inner surface 40e of the upper portion 41 of the holder 40 are joined securely and directly without the use of an adhesive. Note that when the IR cut filter 12 is formed from an inorganic material, the second frame surface 12g of the IR cut filter 12 is not welded to the inner surface 40f of the bottom portion 42 of the holder 40, and instead, the frame portion 12b of the IR cut filter 12 is fitted into a groove 40s formed on a boundary between the side wall portion 43 and the bottom portion 42 of the holder 40 so as to be fixed with stability.

In the image pickup lens unit 100 having the structure described above, the sealing portion 14 is disposed between the lens 11 and the IR cut filter 12 in order to seal the internal space IS sandwiched between the lens 11 and the IR cut filter 12, and therefore the holder 40 can be formed with the lens 11 and the IR cut filter 12 incorporated therein while preventing liquid resin from flowing in between the lens 11 and the IR cut filter 12 during molding of the holder 40. By molding the holder 40 integrally with the lens 11 and the IR cut filter 12 incorporated therein in this manner, the image pickup lens unit 100 can be reduced in size while maintaining the size of the lens 11, and reductions in the number of components and the number of assembly man-hours can be achieved. Further, no unnecessary gaps are formed in the side faces of the optical member 10, including the lens 11, or in the side faces of the IR cut filter 12, and therefore the image pickup lens unit 100 can be reduced in size so as to be more likely to satisfy external appearance specifications required when the image pickup lens unit 100 is mounted in a final product such as an image pickup apparatus. Hence, when the holder 40 is molded integrally with the lens 11 and the IR cut filter 12, a reduction in a dimensional precision of the holder 40 caused by deformation occurring upon release thereof from the mold is less likely to occur than when the holder 40 is molded singly. Moreover, the holder 40 contacts the periphery of the optical member 10 closely without gaps, and therefore ghosting and flaring can be suppressed. In addition, during molding of the holder 40, the lens 11 and the IR cut filter 12 are connected in a high-temperature mold assembly 50, and therefore air contracts following the molding. As a result, although air in the internal space Is expands during reflow deformation of the holder 40 and so on can be prevented.

A method of manufacturing the image pickup lens unit 100 shown in FIG. 1A and so on will be described below with reference to manufacturing procedures shown in FIG. 2 and so on.

Figure 2:
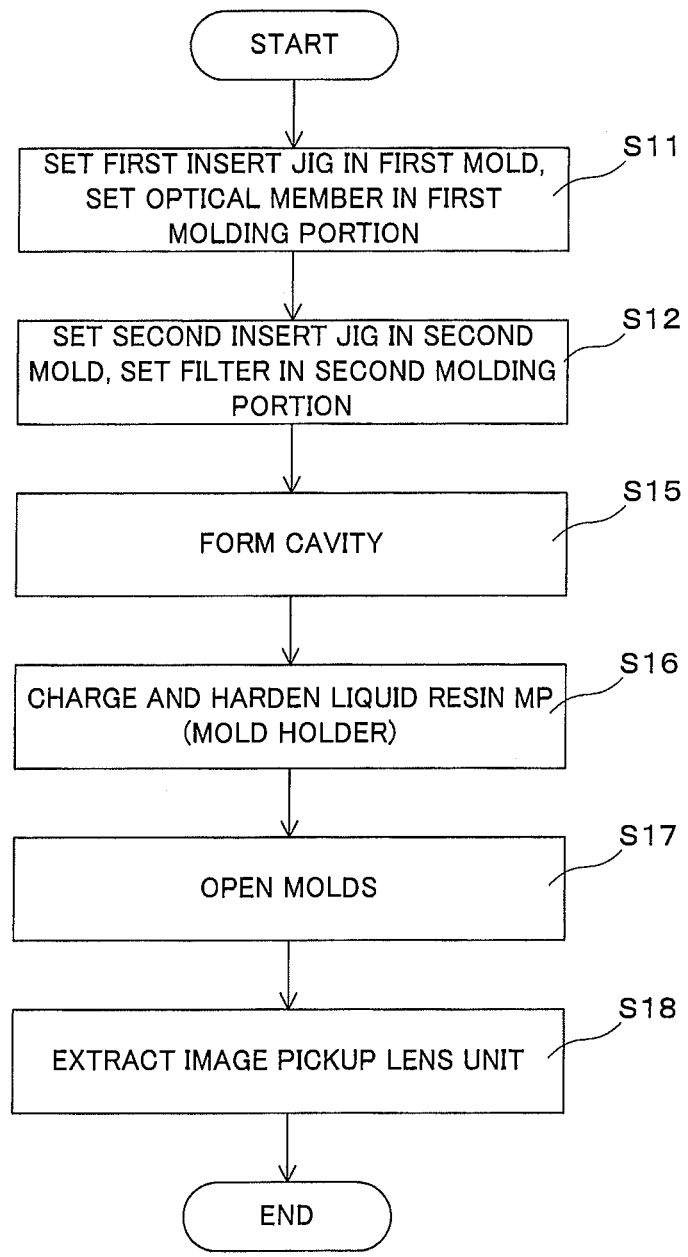
FIG. 2 is a flowchart illustrating procedures for manufacturing the image pickup lens unit shown in FIG. 1.
Figure 3:
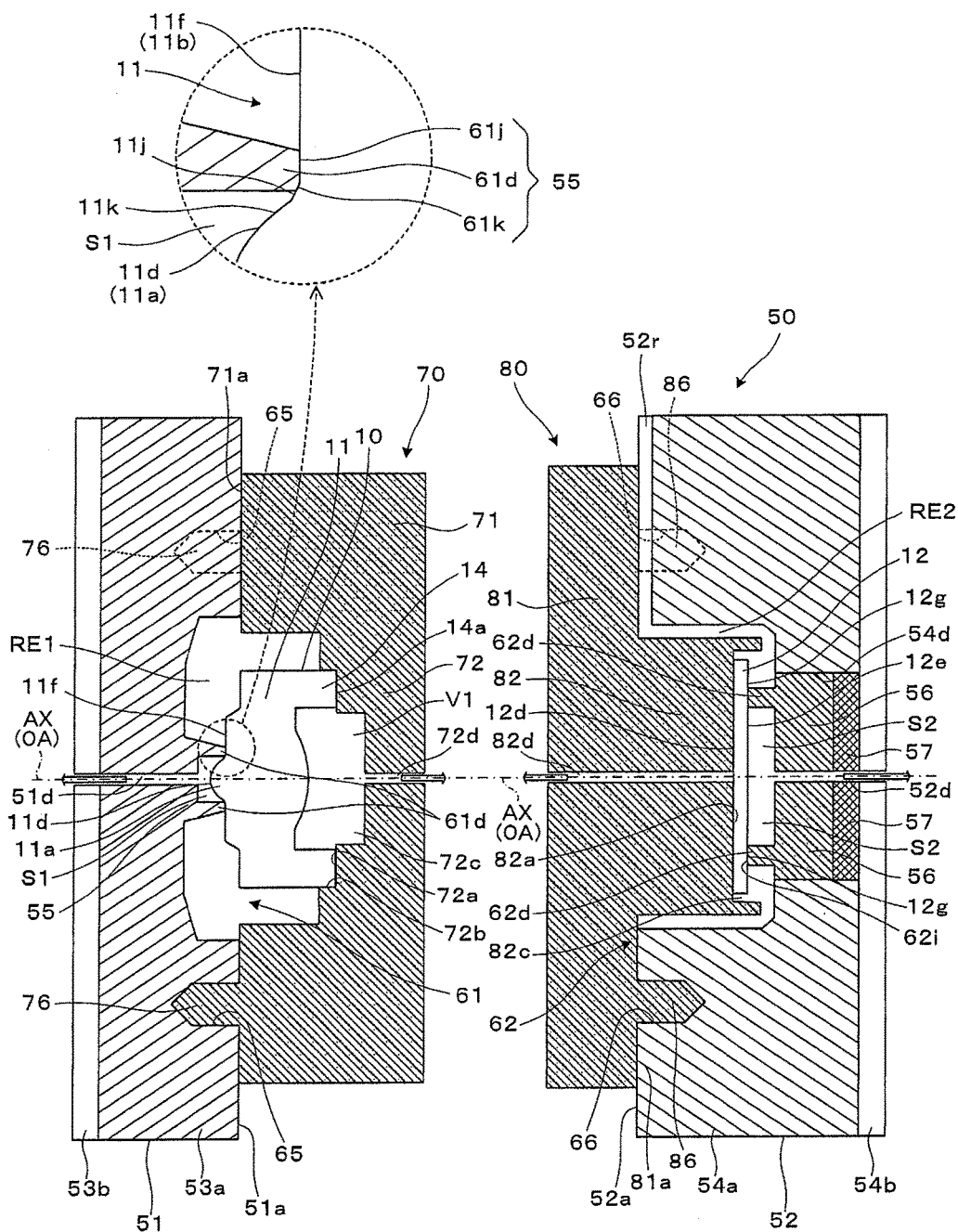
FIG. 3 is a sectional view illustrating a process for setting an optical member and an IR cut filter in a mold using an insert jig.

First, as shown in FIG. 3, the mold assembly 50, which includes a first mold 51 and a second mold 52, is operated appropriately such that the two molds 51 and 52 are open and a first insert jig (a first attachment jig) 70 holding the optical member 10 in advance is temporarily fixed to a first molding portion 61 provided on the first mold 51, shown on a left side of the drawing, in alignment therewith. In other words, setting is performed to attach the first insert jig 70 to the first molding portion 61 of the first mold 51 (a first half of step S11 in FIG. 2). The first molding portion 61 serving as the setting subject of the first insert jig 70 is indented from a parting surface 51a of the first mold 51 so as to form a recessed portion RE1. The optical member 10 held by the set first insert jig 70 is supported within the recessed portion RE1 in alignment therewith.

Here, the first mold 51 comprises a main body 53a including the parting surface 51a, and an attachment plate 53b that supports the main body 53a from the rear. The first molding portion 61 is formed on an inner side of the main body 53a opposing the second mold 52, and a holding portion 55 for supporting the optical member 10 is formed so as to be annexed to the first molding portion 61. The holding portion 55 is provided with a suction tube 51d that communicates with a center of a bottom surface of the holding portion 55 in order to suction the optical member 10 received from the first insert jig 70. The suction tube 51d is made capable of suction externally at an appropriate timing by a driving mechanism annexed to the mold assembly 50, and by removing air through the suction tube 51d, a space S1 adjacent to the lens main body 11a of the lens 11 can be decompressed or set at negative pressure. By decompressing the space S1 in this manner, the optical member 10 that opposes and contacts the holding portion 55 can be suctioned and thus fixed to the holding portion 55 by a desired suction force. In other words, the suction tube 51d functions as a fixing mechanism for fixing the optical member 10. To release the optical member 10 from the holding portion 55, decompression of the space S1 may be stopped, or the space S1 may be pressurized or set at positive pressure.

Note that the first mold 51 is also provided with a heating mechanism for heating the first mold 51, a platen for pressing the first mold 51 from the rear, and so on, but these components have been omitted from the drawing to facilitate understanding.

Meanwhile, the first insert jig (the first attachment jig) 70 is driven remotely by a control driving apparatus, not shown in the drawing, to convey the optical member 10 while holding the optical member 10 temporarily. The first insert jig 70 includes a main body 71, a support portion 72 that supports the sealing portion 14 of the optical member 10, and a plurality of fitting pins 76 for positioning the optical member 10 relative to the first mold 51. A stepped bottom surface 72a provided in a recessed portion 72c of the support portion 72 aligns the optical member 10 in a direction of an axis AX via the sealing portion 14, while a stepped side face 72b provided in the recessed portion 72c of the support portion 72 aligns the optical member 10 in a perpendicular direction to the axis AX via the sealing portion 14. A suction tube 72d is formed in the support portion 72 to communicate with a center of a bottom surface of the recessed portion 72c. The suction tube 72d is made capable of suction externally at an appropriate timing by a driving mechanism annexed to the first insert jig 70, and by removing air from a space V1 that is adjacent to the lens 11 and so on of the optical member 10 held by the first insert jig 70 so that the space V1 is decompressed, the optical member 10 can be suctioned and thus fixed to the recessed portion 72c of the support portion 72 by a desired suction force. To release the optical member 10 from the support portion 72, decompression of the space V1 may be stopped or the space V1 may be pressurized. The fitting pins 76 are used to position the first insert jig 70 when the first insert jig 70 is set relative to the first mold 51, and are fitted into a plurality of fitting holes 65 provided in the main body 53a of the first mold 51. As a result, the optical axis OA of the optical member 10 held by the first insert jig 70 can be substantially aligned with the axis AX of the first molding portion 61 of the first mold 51 easily. Furthermore, by bringing a reference surface 71a of the first insert jig 70 into close contact with the parting surface 51a of the first mold 51, the optical member 10 can be moved to a target position close to the holding portion 55 provided on the first molding portion 61. When, in this condition, decompression by the suction tube 51d of the holding portion 55 provided in the first mold 51 is started and decompression by the suction tube 72d of the first insert jig 70 is stopped so as to switch to a released condition in which the hold on the optical member 10 is released, the optical member 10 is passed from the support portion 72 of the first insert jig 70 to the holding portion 55 of the first mold 51 and fixed using the holding portion 55 with its high precision. In other words, the optical member 10 is attached to, i.e. set on, the first molding portion 61 (latter half of step S11 in FIG. 2). Note that alignment portions constituted by the fitting pins 76 and the fitting holes 65 are provided in at least two locations so that the first insert jig 70 is supported with stability. In the example shown in the drawing, the alignment portions are not provided on an identical longitudinal section, and a fitting pin 76 and a fitting hole 65 on an upper side are indicated by dotted lines.

The holding portion 55 for fixing the optical member 10 is constituted by a cylindrical projection 61d. The projection 61d serves as a positioning member that supports the optical member 10 in the optical axis OA direction and aligns the optical member 10 in the lateral direction perpendicular to the optical axis OA. Here, an inclined surface 11j serving as a curved portion is provided between an outer peripheral surface of the lens main body 11a and the frame portion 11b so as to surround the optical surface 11d, while a contact flat surface 61j that opposes the frame portion 11b and a contact inclined surface 61k that opposes the inclined surface 11j are provided on an upper end side of the projection 61d of the holding portion 55 (see enlarged view in FIG. 3). The contact inclined surface 61k of the projection 61d contacts the inclined surface 11j of the lens main body 11a upon reception of the optical member 10, and thereby serves to align the axis AX of the first molding portion 61 with the optical axis OA of the lens 11 precisely. During molding to be described below, the projection 61d of the holding portion 55 also serves to prevent liquid resin MP from flowing into the space S1 adjacent to the optical surface 11d of the lens 11 (see FIG. 6). When the optical member 10 held by the first insert jig 70 is passed to the projection 61d described above, end surfaces 61j and 61k of the projection 61d are preferably slightly spaced or removed from the optical surface 11d of the lens 11. In so doing, damage to the optical surface 11d of the lens 11 can be prevented reliably.

Positioning of the optical member 10 relative to the first mold 51 may also be realized by providing the projection 61d of the holding portion 55 with a contact surface formed to oppose an inclined portion (a curved portion) 11k provided in an in-plane region of the optical surface 11d of the lens main body 11a on the exterior of an effective region thereof, and bringing this contact surface into contact with the inclined portion (the curved portion) 11k. In this case, the surface of the lens main body 11a on which the optical surface 11d is formed can be used, and therefore the inclined surface 11j and so on described above need not be provided on the outer side of the optical surface 11d for positioning.

Figure 4:
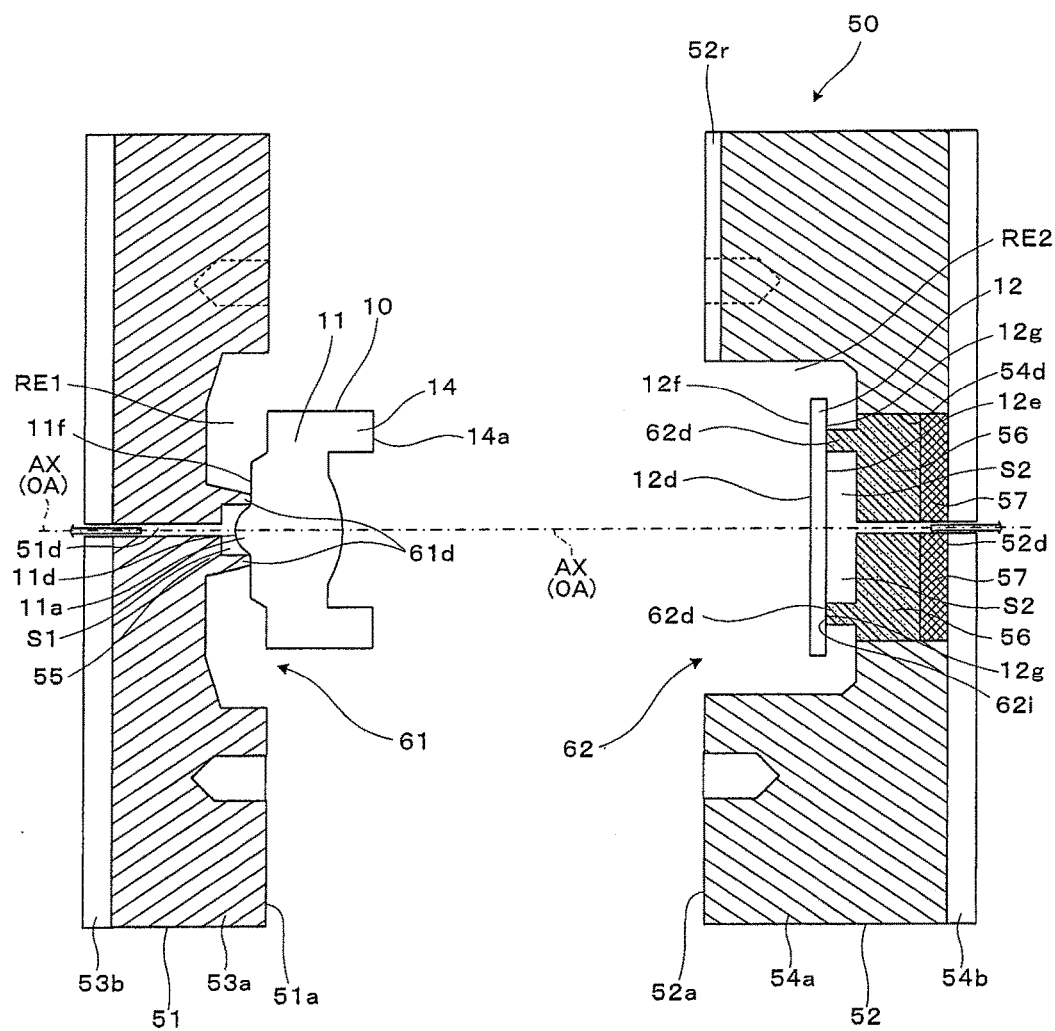
FIG. 4 is a sectional view illustrating a condition following removal of the insert jig.

When setting of the optical member 10 on the first molding portion 61 is complete, the first insert jig 70 is removed from the first mold 51 (see FIG. 4).

Next, as shown in FIG. 3, a second insert jig (a second attachment jig) 80 holding the IR cut filter in advance is temporarily fixed to a second molding portion 62 provided on the second mold 52, shown on a right side of the drawing, in alignment therewith. In other words, setting is performed to attach the second insert jig 80 to the second molding portion 62 of the second mold 52 (a first half of step S12 in FIG. 2). The second molding portion 62 serving as the setting subject of the second insert jig 80 is indented from a parting surface 52a of the second mold 52 to form a recessed portion RE2. The IR cut filter 12 held by the set second insert jig 80 is supported within the recessed portion RE2 in alignment therewith.

Here, the second mold 52 includes a main body 54a including the parting surface 52a, and an attachment plate 54b that supports the main body 54a from the rear. The second molding portion 62 is formed on an inner side of the main body 54a opposing the first mold 51, and a fixing member 56 serving as a holding portion for supporting the IR cut filter 12 is embedded in the second molding portion 62 so as to be annexed thereto, while a resin injection portion 52r is provided to extend peripherally from the second molding portion 62 along the parting surface 52a. The fixing member (the holding portion) 56 is embedded so as to fit into a hole 54d formed in the main body 54a of the second mold 52, and a back surface of the fixing member 56 is supported by the attachment plate 54b via an elastic body 57. Apart from the elastic body 57, each part of the first mold 51 and the second mold 52 is formed from a hard material such as metal or ceramic. Therefore, when the fixing member 56 receives a pressing force from a perpendicular direction to the parting surface 52a, the fixing member 56 is slightly displaced elastically relative to the main body 54a in the direction of the axis AX, and when the pressing force is not received, the fixing member 56 returns to its original position. For example, even if the lens 11 tilts (inclines) when being passed from the insert jig 70, the attitude of the lens 11 can be corrected gently by clamping the molds, and therefore tilting of the lens 11 can be suppressed. The elastic body 57 may be formed from an elastic material such as rubber or another resin, or formed from an elastic member such as a spring. The fixing member 56 and the elastic body 57 together function as a displacement mechanism that allows for thickness errors in the IR cut filter 12 and the optical member 10. A suction tube 52d is provided to penetrate the fixing member 56 and the elastic body 57. The suction tube 52d is made capable of suction externally at an appropriate timing by a driving mechanism annexed to the mold assembly 50, and by removing air from a space S2 that is adjacent to the IR cut filter 12 so that the space S2 is decompressed, the IR cut filter 12 can be suctioned and fixed to the fixing member 56 by a desired suction force. In other words, the suction tube 52d functions as a fixing mechanism for fixing the IR cut filter 12.

Note that the second mold 52 is also provided with a heating mechanism for heating the second mold 52, a platen for pressing the second mold 52 from the rear, and so on, but these components have been omitted from the drawing to facilitate understanding.

Meanwhile, the second insert jig (the second attachment jig) 80 is driven remotely by a control driving apparatus, not shown in the drawing, to convey the IR cut filter 12 while holding the IR cut filter 12 temporarily. The second insert jig 80 includes a main body 81, a support portion 82 that supports the IR cut filter 12, and a plurality of fitting pins 86 for positioning the IR cut filter 12 relative to the second mold 52. A support surface 82a provided in a recessed portion 82c of the support portion 82 aligns the IR cut filter 12 in the direction of the axis AX. A suction tube 82d that communicates with a center of a bottom surface of the recessed portion 82c is formed in the support portion 82. The suction tube 82d is made capable of suction and air removal externally at an appropriate timing by a driving mechanism annexed to the second insert jig 80, and by decompressing the first flat surface 12d side of the IR cut filter 12 held by the second insert jig 80, the IR cut filter 12 can be suctioned and fixed to the recessed portion 82c of the support portion 82 by a desired suction force. To release the IR cut filter 12 from the support portion 82, decompression by the suction tube 82d may be stopped, or the suction tube 82d may be pressurized. The fitting pins 86 are used to position the second insert jig 80 when the second insert jig 80 is set relative to the second mold 52, and are fitted into a plurality of fitting holes 66 provided in the main body 54a of the second mold 52. Furthermore, by bringing a reference surface 81a of the second insert jig 80 into close contact with the parting surface 52a of the second mold 52, the IR cut filter 12 can be moved to a target position close to the fixing member 56 provided on the second molding portion 62. When, in this condition, decompression by the suction tube 52d provided in the fixing member 56 and so on of the second mold 52 is started and decompression by the suction tube 82d of the second insert jig 80 is stopped so as to switch to a released condition in which the hold on the IR cut filter 12 is released, the IR cut filter 12 is passed from the support portion 82 of the second insert jig 80 to the fixing member 56 of the second mold 52 and fixed. In other words, the IR cut filter 12 is attached to, i.e. set on, the second molding portion 62 (latter half of step S12 in FIG. 2). Note that alignment portions constituted by the fitting pins 86 and the fitting holes 66 are provided in at least two locations so that the second insert jig 80 is supported with stability. In the example shown in the drawing, the alignment portions are not provided on an identical longitudinal section, and a fitting pin 86 and a fitting hole 66 on an upper side are indicated by dotted lines.

The fixing member 56 for fixing the IR cut filter 12 includes a cylindrical projection 62d. The projection 62d serves as a positioning member that supports the IR cut filter 12 in alignment with the optical axis OA direction. During the molding to be described below, the projection 62d of the fixing member 56 also serves to prevent the liquid resin MP from flowing into the space S2 adjacent to the second flat surface 12e of the IR cut filter 12 (see FIG. 6).

When setting of the IR cut filter 12 in the second molding portion 62 is complete, the second insert jig 80 is removed from the second mold 52 (see FIG. 4).

Figure 5:
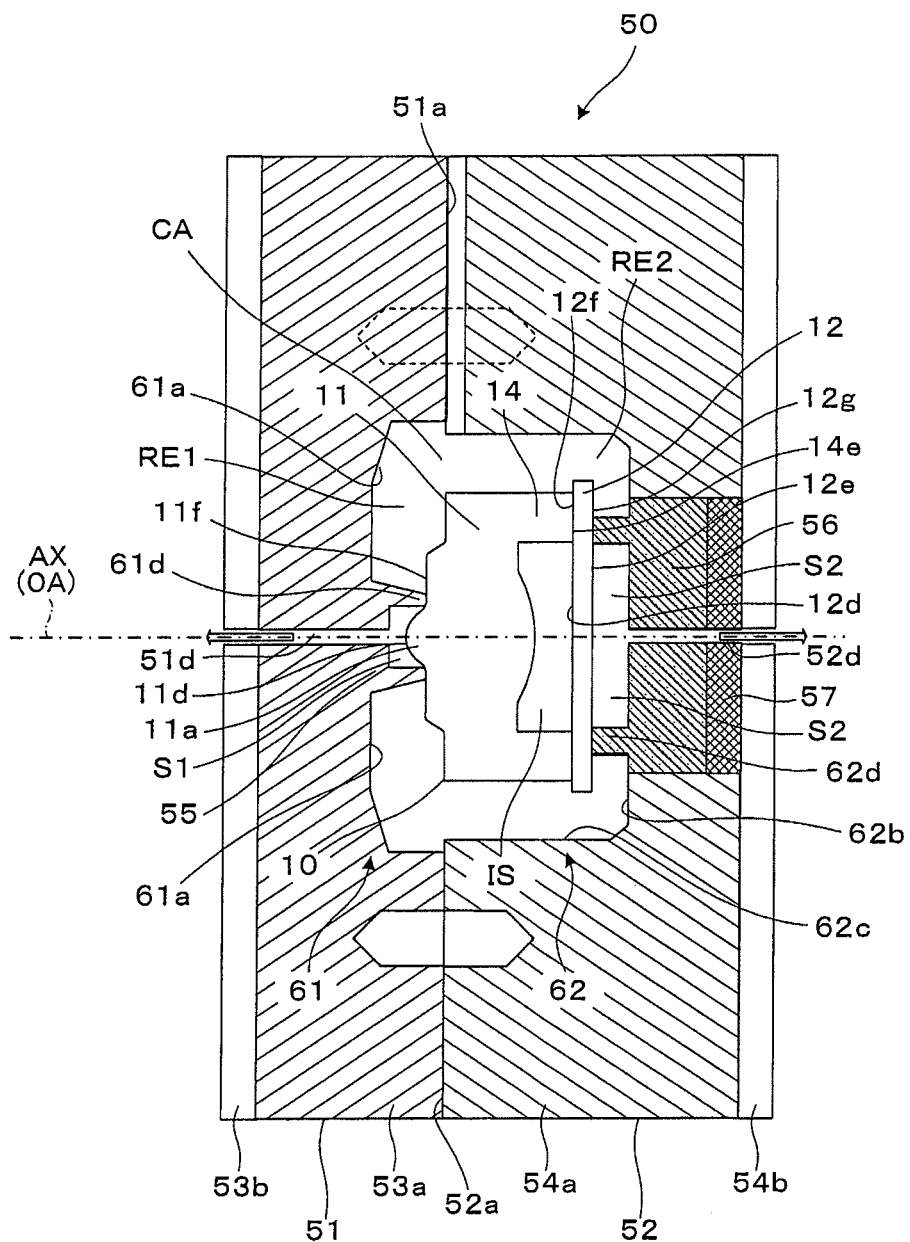
FIG. 5 is a sectional view illustrating a process performed by a manufacturing apparatus to form a cavity.

Next, as shown in FIG. 5, the first mold 51 and the second mold 52 are brought close together and clamped, whereby a cavity CA linking the recessed portion RE1 of the first molding portion 61 to the recessed portion RE2 of the second molding portion 62 is formed between the first mold 51 and the second mold 52 (step S15 of FIG. 2). At this time, the first molding portion 61 provided on the first mold 51 is joined to the second molding portion 62 provided on the second mold 52. Here, a transfer surface 61a for molding an upper surface 40a and so on of the holder 40 shown in FIG. 1 is formed on the first molding portion 61. Further, transfer surfaces 62b and 62c for respectively molding a rear surface 40b and an outer peripheral side face 40c of the holder 40 shown in FIG. 1 are formed on the second molding portion 62 on the second mold 52 side. Here, the holding portion 55 that includes the cylindrical projection 61d and supports the optical member 10 is formed on the first molding portion 61, while the fixing member 56 that includes the cylindrical projection 62d and supports the IR cut filter 12 is provided on the second molding portion 62 on the second mold 52 side to be capable of minute elastic deformation in a perpendicular direction to the parting surface 52a. Therefore, the optical member 10 supported on the first molding portion 61 side and the IR cut filter 12 supported on the second molding portion 62 side come into close contact such that the optical member 10 and the IR cut filter 12 are held with stability inside the cavity CA. More specifically, the contact surface 14e of the sealing portion 14 of the optical member 10 and the contact surface 12f of the IR cut filter 12 contact each other closely at an appropriate pressure. As a result, the internal space IS is formed to be tightly sealed between the optical member 10 and the IR cut filter 12 so that resin or the like is prevented from flowing therein.

Figure 6:
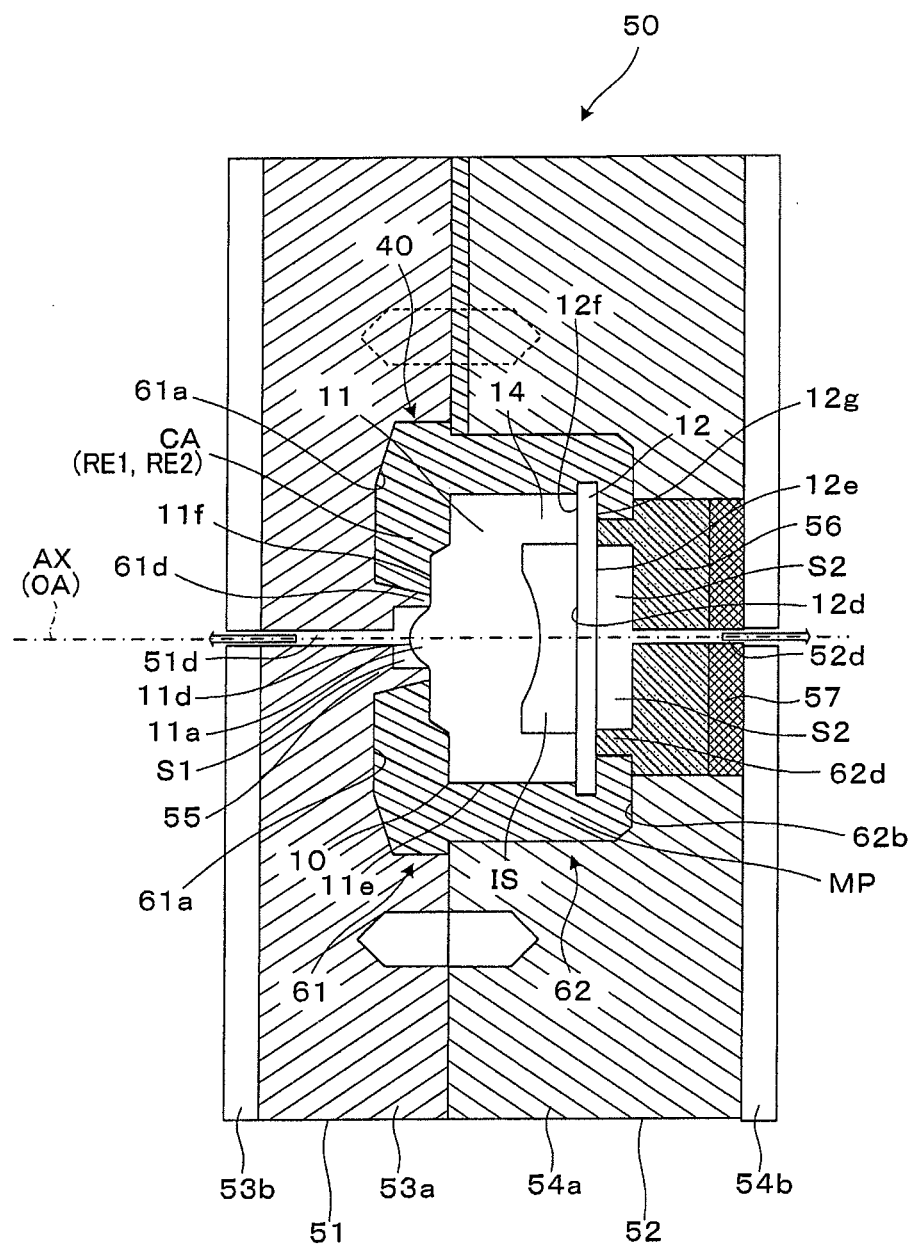
FIG. 6 is a sectional view illustrating a process for molding a holder member.

Next, as shown in FIG. 6, the liquid resin MP serving as the material of the holder 40 is charged into the cavity CA serving as a molding space, whereby the frame surface 11f and side faces 10c of the optical member 10 and the second flat surface 12g and so on of the IR cut filter 12 are respectively covered in resin. The holder 40 is then molded by holding the liquid resin MP in the temperature-regulated mold so that the resin hardens (step S16 of FIG. 2). As a result, the image pickup lens unit 100 shown in FIG. 1, in which the optical member 10 and the IR cut filter 12 are supported between the openings OP1, OP2 of the holder 40 such that the lens 11 and the IR cut filter 12 are housed fixedly in the holder 40, is completed. At this time, the holding portion 55 and the fixing member 56 provided respectively on the first and second molding portions 61 and 62 prevent the liquid resin MP from flowing into the spaces S1 and S2, and therefore serve to form the openings OP1 and OP2 in the holder 40.

Note that in the molding process described above, suction through the suction tubes 51d and 52d is stopped, whereby decompression of the spaces S1 and S2 ceases, immediately after the molds are clamped. However, suction may be stopped at a stage where the liquid resin MP is charged into the cavity CA or continued until the resin hardens. By continuing suction until the resin hardens, the resin can be reliably prevented from flowing around the first optical surface 11d and the second flat surface 12e on the vicinity of the openings OP1 and OP2, which are susceptible to leakage of the liquid resin MP.

Figure 7:
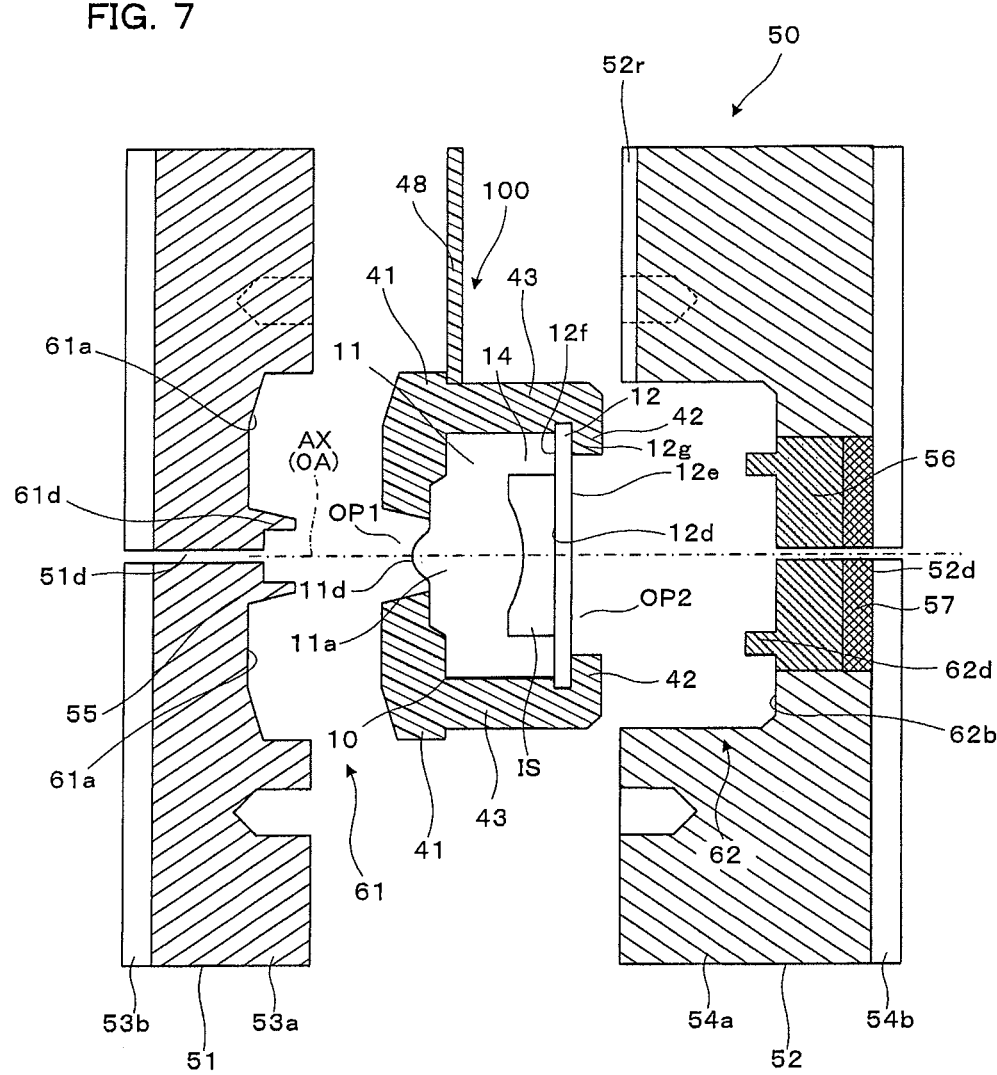
FIG. 7 is a sectional view illustrating a process for opening the mold and extracting the image pickup lens unit.

Next, as shown in FIG. 7, the second mold 52 and the first mold 51 are separated and opened such that the second mold 52 is retracted (step S17 in FIG. 2), whereupon an ejector pin or the like, not shown in the drawing, provided on the mold, from among the first mold 51 and the second mold 52, in which the molded component remains is used to push out the image pickup lens unit 100 so that the image pickup lens unit 100 is released from the mold. In so doing, the image pickup lens unit 100 serving as an end product can be extracted from the first mold 51 or the second mold 52 (step S18 in FIG. 2). An injection trace portion 48 extends from the image pickup lens unit 100 in accordance with a shape of the resin injection portion 52r. The injection trace portion 48 is removed in a subsequent finishing process. The injection trace portion 48 can be removed using a submarine gate (not shown) when the image pickup lens unit 100 is pushed out of the mold.

With the image pickup lens unit 100 and the manufacturing method thereof according to the first embodiment, described above, the sealing portion 14 is provided between the lens 11 and the IR cut filter 12 in order to seal the internal space IS sandwiched between the lens 11 and the IR cut filter 12, and therefore the holder 40 can be molded integrally with the lens 11 and the IR cut filter 12 incorporated therein while preventing the liquid resin MP from flowing in between the lens 11 and the IR cut filter 12. By molding the holder 40 integrally with the lens 11 and the IR cut filter 12 incorporated therein in this manner, the image pickup lens unit 100 can be reduced in size, and reductions in the number of components and the number of assembly man-hours can be achieved.

[Second Embodiment]

An image pickup lens unit and a manufacturing method thereof according to a second embodiment will be described below. Note that the image pickup lens unit and the manufacturing method thereof according to the second embodiment differ only partially from the image pickup lens unit 100 and so on of the first embodiment, and therefore parts not described specifically are identical to the first embodiment.

Figure 8A:
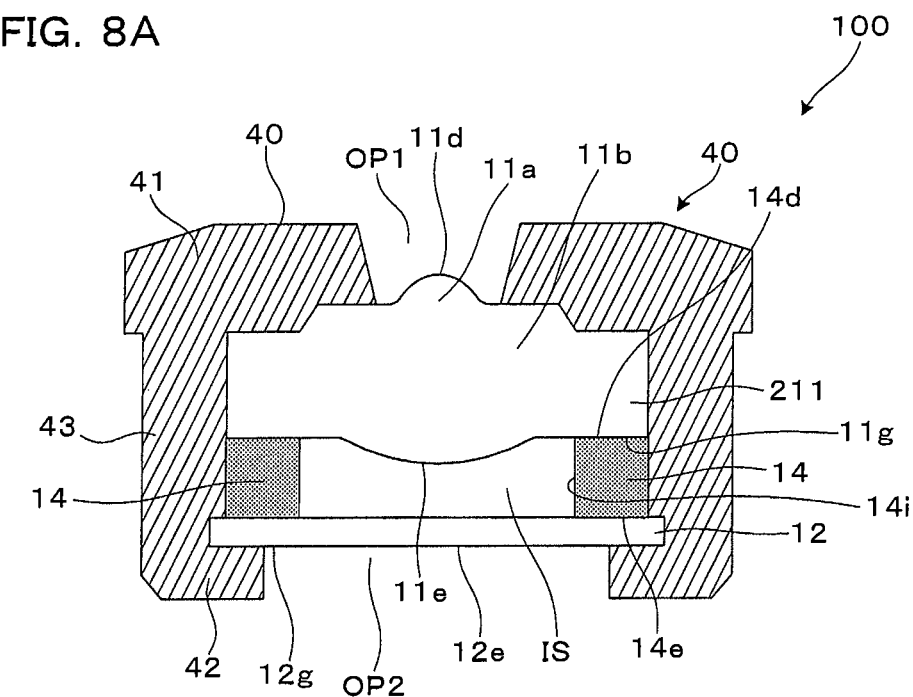
FIG. 8A is a view illustrating an image pickup lens unit and a manufacturing method thereof according to a second embodiment.

As shown in FIG. 8A, the image pickup lens unit 100 according to the second embodiment includes a lens 211, the IR cut filter 12, the sealing portion 14 interposed between the lens 11 and the IR cut filter 12, and the case-shaped holder 40 housing these members integrally. In other words, in this embodiment, the lens 11 and the sealing portion 14 are formed separately. In this case, greater freedom can be obtained with respect to the shape and material of the sealing portion 14. Further, a contact surface (a lens frame surface) 11g of the lens 211 and a contact surface 14d of the sealing portion 14 are connected in advance by an adhesive so that a member constituted by the connected lens 11 and sealing portion 14 can be attached integrally to the first molding portion 61 of the first mold 51 by the first insert jig 70 alone.

Since the sealing portion 14 is provided separately from the lens 11, the sealing portion 14 may be formed from either an identical material or a different material from the lens 11. When formed from a different material from the lens 11, the sealing portion 14 can be provided with a light blocking property, for example, so as to function as a stop or diaphragm. The sealing portion 14 is formed from glass, resin, metal, or the like, and when the sealing portion 14 is to function as a stop or diaphragm, a light blocking coating may be applied to the inner surface 14i of the sealing portion 14, for example.

Figure 8B:
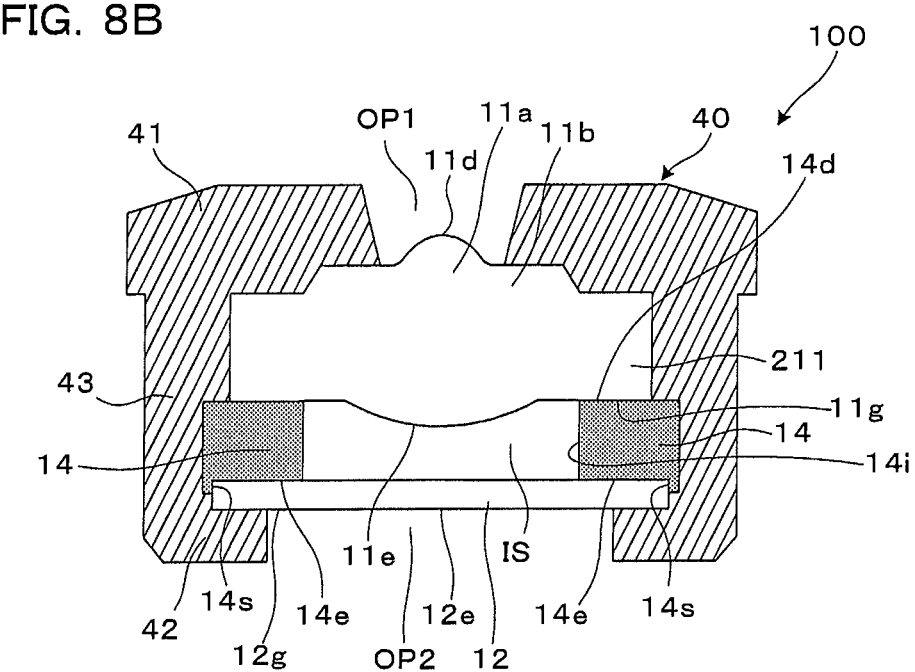
FIG. 8B is a view illustrating a modified example of the image pickup lens unit and so on shown in FIG. 8A.

As shown in FIG. 8B, in the image pickup lens unit 100 according to the modified example of the unit of FIG. 8A, in addition to providing the lens 211 and the sealing portion 14 separately, the IR cut filter 12 is embedded fixedly in a step portion 14s provided on an opening OP2 side outer periphery of the sealing portion 14. Here, the IR cut filter 12 may be connected to the step portion 14s by fitting such as press fitting or the like, and the IR cut filter 12 may be temporarily mounted on the sealing portion 14 or the like. In other words, the step portion 14s of the sealing portion 14 constitutes a fitting portion that functions as a positioning portion for positioning the IR cut filter 12. In this case, the sealing portion 14 and the IR cut filter 12 can be connected without using an adhesive, whereupon the IR cut filter 12 and the sealing portion 14 can be set in the second molding portion 62 of the second mold 52 as a connected member.

[Third Embodiment]

An image pickup lens unit and a manufacturing method thereof according to a third embodiment will be described below. Note that the image pickup lens unit and the manufacturing method thereof according to the third embodiment differ only partially from the image pickup lens unit 100 and so on of the first embodiment, and therefore parts not described specifically are identical to the first embodiment.

Figure 9:
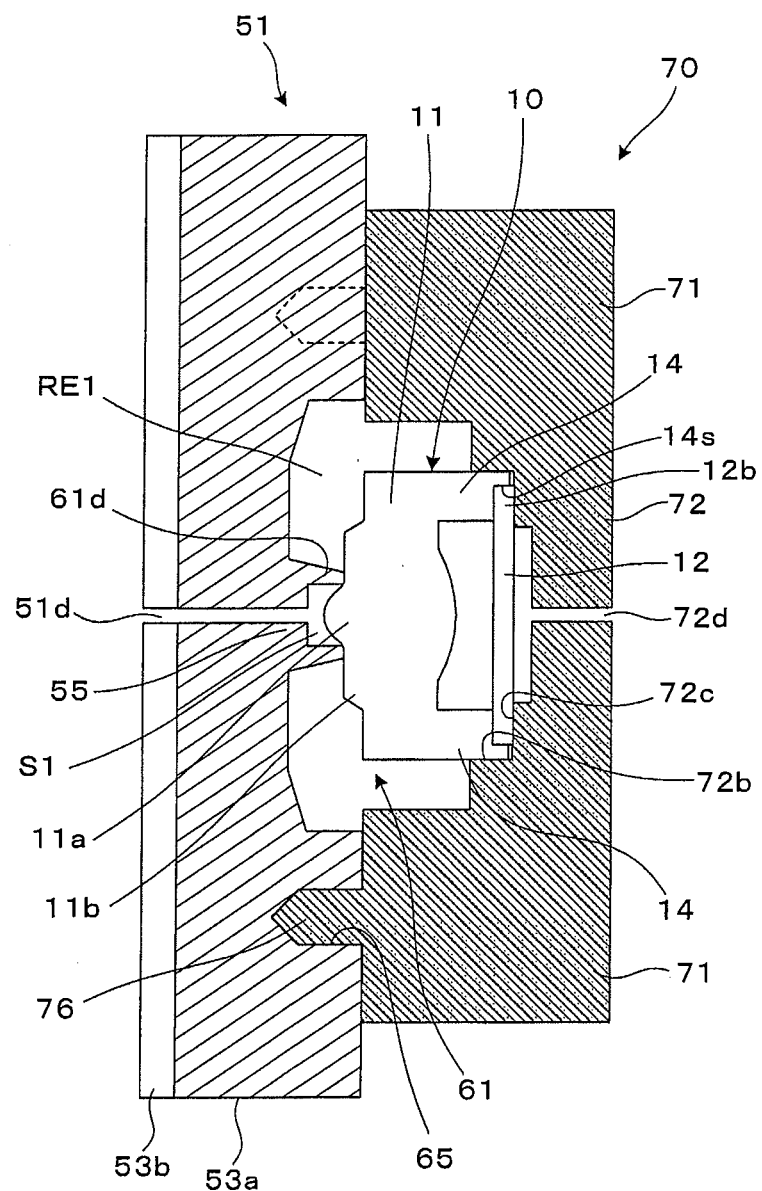
FIG. 9 is a view illustrating an image pickup lens unit and a manufacturing method thereof according to a third embodiment.

As shown in FIG. 9, the optical member 10 and the IR cut filter 12 included in the image pickup lens unit 100 according to the second embodiment are connected in advance before being held by the insert jig 70 and set in the first molding portion 61 of the first mold 51.

Here, the step portion 14s is formed on an opening side outer periphery of the sealing portion 14 provided in the optical member 10, and the IR cut filter 12 is embedded fixedly in the step portion 14s. The IR cut filter 12 can be temporarily mounted on the step portion 14s by being fitted thereto connectedly. In other words, the step portion 14s on the sealing portion 14 of the optical member 10 constitutes a fitting portion that functions as a positioning portion for positioning the IR cut filter 12. In this case, the optical member 10 and the IR cut filter 12 can be connected without using an adhesive, whereupon the optical member 10 and the IR cut filter 12 can be set in the first molding portion 61 of the first mold 51 as a connected member. Hence, in this embodiment, the second insert jig 80 shown in FIG. 3 is not required. Moreover, following molding, similarly to the second embodiment shown in FIG. 8B, a boundary between the sealing portion 14 of the optical member 10 and the frame portion 12b of the IR cut filter 12 can be covered in the resin. As a result, the optical member 10 and the IR cut filter 12 are fitted and connected securely, thereby enhancing the sealing function of the liquid resin MP.

[Fourth Embodiment]

An image pickup lens unit and a manufacturing method thereof according to a fourth embodiment will now be described. Note that the image pickup lens unit and the manufacturing method thereof according to the fourth embodiment differ only partially from the image pickup lens unit 100 and so on of the first embodiment, and therefore parts not described specifically are identical to the first embodiment.

Figure 10:
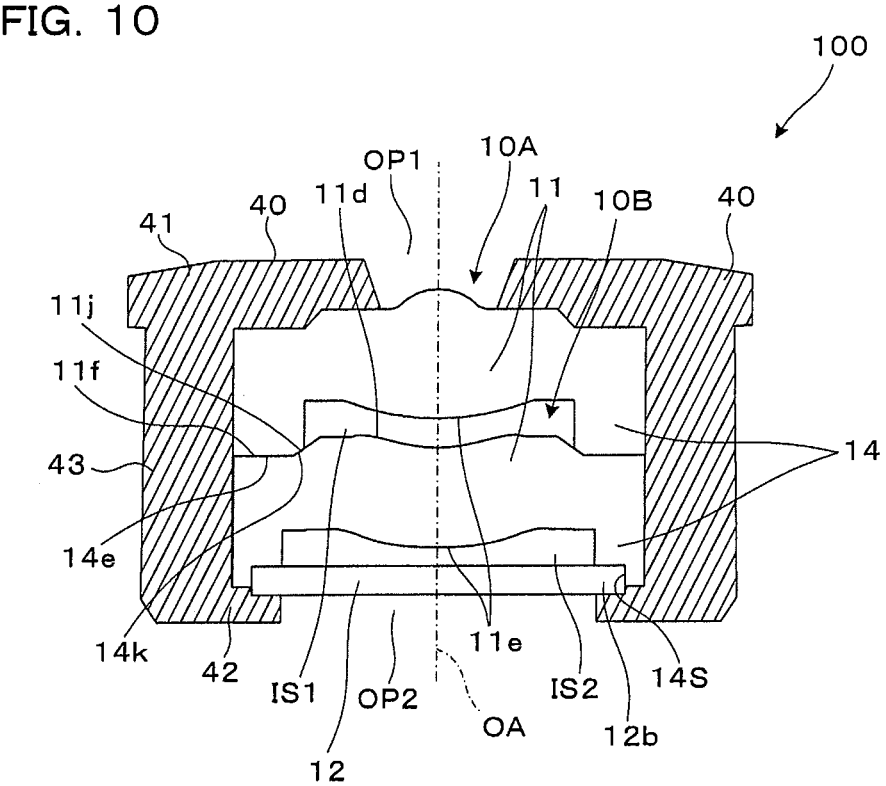
FIG. 10 is a view illustrating an image pickup lens unit according to a fourth embodiment.

As shown in FIG. 10, the image pickup lens unit 100 includes a first optical member 10A, a second optical member 10B, the IR cut filter 12, and the holder 40. Here, the first and second optical members 10A and 10B are structured substantially identically to the optical member 10 shown in FIG. 1A. In other words, the first optical member 10A includes the lens 11 and the sealing portion 14, and the second optical member 10B also includes the lens 11 and the sealing portion 14. Note, however, that the lens 11 of the first optical member 10A and the lens 11 of the second optical member 10B have differently shaped optical surfaces. Further, the sealing portion 14 of the first optical member 10A is interposed between the lens 11 of the first optical member 10A and the lens 11 of the second optical member 10B, whereas the sealing portion 14 of the second optical member 10B is interposed between the lens 11 of the second optical member 10B and the IR cut filter 12. Furthermore, the step portion 14s is formed on the opening side outer periphery of the sealing portion 14 provided in the second optical member 10B, and the IR cut filter 12 is embedded fixedly in the step portion 14s. Therefore, similarly to the second embodiment shown in FIG. 8B, the boundary between the sealing portion 14 of the second optical member 10B and the frame portion 12b of the IR cut filter 12 can be covered in the resin. As a result, the second optical member 10B and the IR cut filter 12 can be connected without using an adhesive, whereupon the optical member 10 and the IR cut filter 12 can be set in the second molding portion 62 of the second mold 52 as a connected member. Note that the first and second optical members 10A and 10B do not have to be formed entirely from resin, and may be constructed by sandwiching a glass plate between resin molded bodies, for example.

In the image pickup lens unit 100 according to this embodiment, an internal space IS1 is secured between the lens 11 of the first optical member 10A and the lens 11 of the second optical member 10B by one of the sealing portions 14, and an internal space IS2 is secured between the lens 11 of the second optical member 10B and the IR cut filter 12 by the other sealing portion 14.

Note that a mutual positioning structure is formed between the sealing portion 14 of the first optical member 10A and the lens 11 of the second optical member 10B. More specifically, an inclined surface 11j is provided on an outer peripheral surface of the lens 11 of the second optical member 10B so as to surround the optical surface 11d, and a contact inclined surface 14k is provided on the contact surface 14e of the sealing portion 14 of the first optical member 10A so as to oppose the inclined surface 11j. As a result, when the first mold 51 and the second mold 52 are clamped, the optical axis OA of the first optical member 10A can be aligned with the optical axis OA of the second optical member 10B easily and precisely. In other words, the contact inclined surface 14k provided on the sealing portion 14 of the first optical member 10A functions as a positioning portion for positioning the second optical member 10B. Note that even when a mutual positioning structure is not provided between the sealing portion 14 of the first optical member 10A and the lens 11 of the second optical member 10B, the first optical member 10A and the second optical member 10B can be positioned precisely using the fitting holes and so on provided in the second insert jig 80 and the second mold 52.

Figure 11:
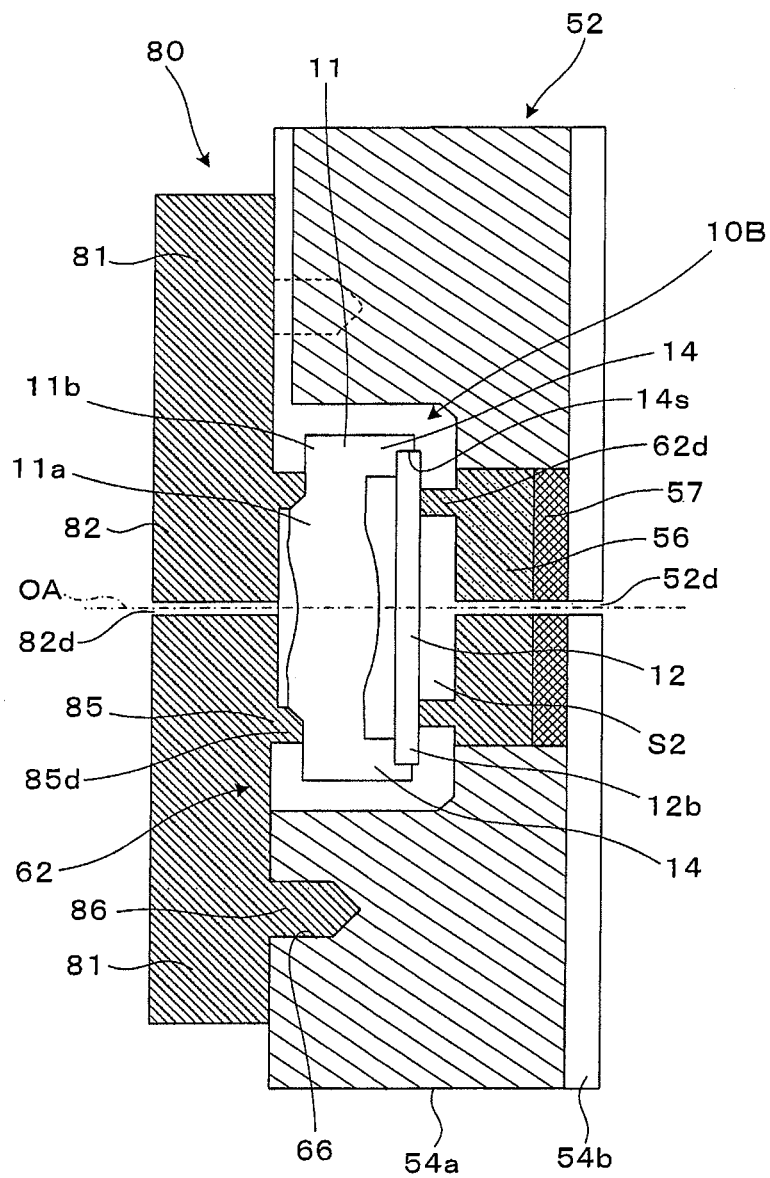
FIG. 11 is a view illustrating a method of manufacturing the image pickup lens unit according to the fourth embodiment.

As shown in FIG. 11, the second optical member 10B and the IR cut filter 12 are held by the second insert jig 80 in a pre-connected condition and set thus in the second molding portion 62 of the second mold 52.

Here, the IR cut filter 12 is temporarily mounted on the step portion 14s of the second optical member 10B by being fitted thereto connectedly. As a result, the second optical member 10B and the IR cut filter 12 are set in the second molding portion 62 of the second mold 52 as a connected member.

The second optical member 10B is supported by a holding portion 85 of the second insert jig 80 while being suctioned by negative pressure from the suction tube 82d. Here, the holding portion 85 includes a cylindrical projection 85d that is capable of supporting the lens 11 of the second optical member 10B in alignment with the perpendicular direction to the optical axis OA and the direction of the optical axis OA using a similar method to the projection 61d of the holding portion 55 provided on the first mold 51.

The present invention was described above using embodiments thereof, but the present invention is not limited to the above embodiments.

For example, in the first to fourth embodiments, the optical member 10, 10A, 11B, the IR cut filter 12, and so on are described as being rectangular when seen from above, but this is merely an example, and the optical member 10, 10A, 11B and the IR cut filter 12 may be circular when seen from above. In this case, the entire image pickup lens unit 100 may be formed in a columnar shape or a quadratic prism shape.

Further, in the above embodiments, the optical member 10, 10A, 11B, the lens 11, and so on shown in FIGS. 1A, 8A, 10, and so on are made of resin, but may be constituted by a hybrid optical element or lens, or a glass optical element or lens. Here, a hybrid optical element or lens is cut out of a wafer lens or a lens wafer in which a resin layer having an optical function is formed on one or both surfaces of a transparent glass or resin substrate, for example.

Furthermore, in the above embodiments, only the single IR cut filter 12 is provided, but a plurality of filters having different functions may be incorporated into the image pickup lens unit 100.

Moreover, in the above embodiments, there are no particular limitations on a dimension of the IR cut filter 12 in the perpendicular direction to the optical axis OA and a dimension of the optical member 10, 10A and 11B in the perpendicular direction to the optical axis OA, but when a difference between the two dimensions is large, it is necessary to amend a support method and a pressure resistance during molding.

Furthermore, in the above embodiments, the fixing member 56 is provided on the second mold 52, and the fixing member 56 is supported by the elastic body 57, but a similar elastic adjustment mechanism may be provided on the holding portion 55 of the first mold 51. Further, as long as a clamping precision of the first and second molds 51 and 52, shape dimensions of the optical member 10, and so on are accurate, the fixing member 56 of the second mold 52 may be fixed instead of being displaced by the elastic body 57. Moreover, interchangeable spacers having different thicknesses may be provided in place of the elastic body 57.

The projection 61d of the holding portion 55 is not limited to a cylindrical shape, and may be constituted by a columnar or truncated cone-shaped projection having a surface shape corresponding to the optical surface 11d of the optical member 10 on an apex portion thereof. Similarly, the projection 62d of the fixing member 56 is not limited to a cylindrical shape, and may be constituted by a columnar or truncated cone-shaped projection having a flat top surface that corresponds to the second flat surface 12e of the IR cut filter 12.

Further, in the above embodiments, the first mold 51 and the second mold 52 are disposed horizontally, but the mold assembly 50 may be made vertical so that the first and second molds 51 and 52 are brought close and separated in a vertical direction.

The invention claimed is:

1. A manufacturing method for an image pickup lens unit including a lens, a filter, and a holder that holds the lens and the filter in an interior thereof, the manufacturing method comprising the steps of:
    attaching the lens to a first mold so as to be positioned on the first mold which is in an open condition;
    attaching the filter to a second mold so as to be positioned on the second mold which is in an open condition;
    closing the first and second mold to form an internal space sandwiched between the lens and the filter and a molding space on a periphery of the lens and the filter; and
    molding a holder member that holds the lens and the filter in an interior thereof by charging a resin into the molding space and hardening the resin.

2. The manufacturing method for an image pickup lens unit according to claim 1, wherein when the molding space is formed on the periphery of the lens and the filter, a sealing portion for sealing the internal space sandwiched between the lens and the filter is disposed between the lens and the filter.

3. The manufacturing method for an image pickup lens unit according to claim 1, wherein at least one of the first mold and the second mold includes a displacement mechanism for adjusting a position of at least one of the lens and the filter in a mold opening/closing direction.

4. The manufacturing method for an image pickup lens unit according to claim 1, wherein the first mold includes a first fixing mechanism that suctions the lens using negative pressure in order to hold the lens and the second mold includes a second fixing mechanism that suctions the filter using negative pressure in order to hold the filter.

5. The manufacturing method for an image pickup lens unit according to claim 1, wherein the first mold includes a first positioning holding portion for positioning the lens relative to the mold while attaching the lens and the second mold includes a second positioning holding portion for positioning the filter relative to the mold while attaching the filter.

6. The manufacturing method for an image pickup lens unit according to claim 1, wherein the lens and the filter are positioned and attached to the first mold and the second mold in an open condition using an attachment jig, respectively.

7. The manufacturing method for an image pickup lens unit according to claim 1, wherein in order to hold a first lens and a second lens in the interior of the holder, the first lens is attached to the first mold in an open condition and a temporary assembly of the second lens and the filter is attached to the second mold in the open condition, whereupon the first mold and the second mold are closed and clamped such that the first lens contacts the second lens.

8. The manufacturing method for an image pickup lens unit according to claim 1, wherein the holder is formed from at least one of LCP resin and PPA resin.

* * * * *